US012751420B2

(12) United States Patent
Caffey

(10) Patent No.: US 12,751,420 B2
(45) Date of Patent: Oct. 6, 2026

(54) BICYCLE DOG LEASH ATTACHMENT AND METHOD OF USE

(71) Applicant: Keith Caffey, Cypress, TX (US)

(72) Inventor: Keith Caffey, Cypress, TX (US)

( * ) Notice: Subject to any disclaimer, the term of this patent is extended or adjusted under 35 U.S.C. 154(b) by 0 days.

(21) Appl. No.: 19/042,864

(22) Filed: Jan. 31, 2025

(65) Prior Publication Data

US 2025/0241271 A1 Jul. 31, 2025

Related U.S. Application Data

(60) Provisional application No. 63/627,772, filed on Jan. 31, 2024.

(51) Int. Cl.
*A01K 1/04* (2006.01)
*A01K 27/00* (2006.01)

(52) U.S. Cl.
CPC .............. *A01K 1/04* (2013.01); *A01K 27/004* (2013.01)

(58) Field of Classification Search
CPC ...... A01K 1/04; A01K 27/004; A01K 15/027; B62K 21/125
USPC ........... 119/771, 772, 769; 482/57; 280/200; 74/551.8
See application file for complete search history.

(56) References Cited

U.S. PATENT DOCUMENTS 3,074,378 A * 1/1963 Clayton ............... A01K 27/005 D30/153
3,150,843 A * 9/1964 Cordoba ................ A01K 89/00 242/380
4,632,453 A * 12/1986 Robbin .................... B62J 1/167 297/243
4,721,320 A * 1/1988 Creps ..................... B62K 27/12 280/495
5,215,037 A * 6/1993 Allred ...................... A01K 1/04 119/781
5,406,816 A * 4/1995 Thomas ..................... B62J 9/21 62/239
5,842,445 A * 12/1998 Barbour ................... A01K 1/04 119/771
6,135,059 A * 10/2000 Brock .................. A01K 15/027 119/702
6,148,772 A * 11/2000 Keyek-Frannsen ...... A01K 1/04 280/292

(Continued)

FOREIGN PATENT DOCUMENTS

EP 3315393 A1 * 5/2018 ............ B62K 21/16

*Primary Examiner* — Maria E Graber
(74) *Attorney, Agent, or Firm* — Kearney, McWilliams & Davis, PLLC; William Yarbrough

(57) ABSTRACT

The present invention is a bicycle handlebar leash attachment, system and method of use for securement of a dog leash to a bicycle's handlebars, via a removable and adjustable attachment means, generally. Specifically, the bicycle handlebar attachment that is the present device and system is secured and reversibly fixed to a bicycle handlebars in a front-facing manner so that a dog may precede a rider and travel in front of the bicycle and rider as to avoid occurrences of collision between the bicycle, bicycle rider and dog. The invention itself is capable of attachment to, detachment from the handlebars of a bicycle as to allow frontward "leading" by the attached dog that may be adjusted as to length of leash lead and/or detached at the bicycle rider's discretion.

19 Claims, 7 Drawing Sheets

(56) References Cited

U.S. PATENT DOCUMENTS

| | | | | | |
|---|---|---|---|---|---|
| 6,318,302 | B1 * | 11/2001 | Bedient | A01K 1/04 | 119/786 |
| 6,810,630 | B2 * | 11/2004 | Chizmas | A01K 1/04 | 52/157 |
| 8,006,650 | B2 * | 8/2011 | Tollman | A01K 1/04 | 280/288.4 |
| 8,253,572 | B2 * | 8/2012 | Lytle, Jr. | B60R 25/00 | 119/796 |
| 8,955,464 | B2 * | 2/2015 | Lytle, Jr. | A01K 27/004 | 701/70 |
| 10,231,439 | B2 * | 3/2019 | Woods | A01K 27/004 | |
| 11,432,532 | B2 * | 9/2022 | Almeida | A01K 27/004 | |
| 2009/0255485 | A1 * | 10/2009 | Dickie | A01K 27/006 | 119/794 |
| 2010/0000369 | A1 * | 1/2010 | Cote | B62K 21/125 | 74/551.8 |
| 2010/0170925 | A1 * | 7/2010 | Osten | B62J 7/06 | 248/309.1 |
| 2011/0277699 | A1 * | 11/2011 | McCarthy | A01K 1/04 | 119/771 |
| 2012/0187169 | A1 * | 7/2012 | Osten | B62J 11/00 | 224/420 |
| 2014/0263799 | A1 * | 9/2014 | Baerwald | A01K 27/004 | 242/381.5 |
| 2016/0165848 | A1 * | 6/2016 | Granger | A01K 29/00 | 119/799 |
| 2024/0051633 | A1 * | 2/2024 | Broadbent | B62J 9/30 | |
| 2025/0228214 | A1 * | 7/2025 | Qiu | A01K 27/005 | |
| 2025/0241271 | A1 * | 7/2025 | Caffey | A01K 27/004 | |

* cited by examiner

BICYCLE DOG LEASH ATTACHMENT AND METHOD OF USE

FIELD OF THE INVENTION

The present invention relates to a bicycle (handlebar) leash attachment, system and method for securement of a dog leash, via a removably and adherable attachment means, generally. Specifically, the bicycle handlebar attachment that is the present invention is securedly and reversibly fixed to a bicycle handlebars (of a receiving bicycle) so that a dog may precede a rider and travel in front of the bicycle and rider as to avoid occurrences of collision between the bicycle, bicycle rider and dog. The invention itself is capable of attachment to, detachment, as well as leash release from the handlebars of a bicycle as to allow frontward "leading" by the attached dog that may be adjusted and/or detached at the bicycle rider's discretion.

BACKGROUND

Historically, bicycle attachments have been restricted to attachments at areas of the bicycle frame whereby the attached dog is made to run alongside the rider. This is evidenced in patent application Ser. No. 15/693,120, application numbers EP 2159144, DE 10334566, EP2244558 and U.S. Pat. No. 14,168,984 (rearward/seat/saddle and side placement) and patent EP3315393 (handlebar-side placement), U.S. Pat. Nos. 6,148,772 and 8,544,420 (rear spoke placement) and/or U.S. Pat. No. 4,854,269 (frame attachment) whereby points of attachment allow the dog and bicycle to compete for space often on narrow sidewalks and paths which restricts the movement of the dog to a defined close proximity along the bicycle.

And, although the front-facing leash assembly that is the present invention has been contemplated (See Ser. No. 12/800,383), this base-plate clamp and swing arm assembly nonetheless is not controllable by the operator and the distance from the bicycle, as well as retrieval, braking, attachment, release and extension are immutable.

Over the years, riders and (presumably canines) have long agonized over the proper relationship between rider/operators, bicycles and dogs and riders continue to struggle to achieve (1) a frontward-facing attachment, (2) supplying a controllable and metered guidance and controlled release and retraction whereby (3) no competition exists between rider, bicycle and dog and wherein (4) reversible and facilitated insertion and securement is implemented with (5) a quick release mechanism for rider and dog safety.

Current leash systems, lacking definite and definitive placement in front of the user and/or control by the user, suffer from deficiencies that remain in the art. It is these deficiencies inventor seeks to remedy.

While strides have been made to overcome the inadequacies of guiding a dog safely in front of a bicycle, it remains evident that considerable failings remain in guided leashes for bicycles and in terms of functionality across the industry. It is in light of the above shortcomings, inventor seeks to remediate the inadequacies of previous failed attempts to address the long felt need for a front-facing dog leash device, system, and method of provision thereof, that adequately serves the need of cyclists seeking to equally enjoy the company of their canine and to provide exercise to the cyclist and dog alike.

While inventor has set forth the best mode or modes contemplated of carrying out the present invention known to the inventor such to enable a person skilled in the art to practice the present invention, the preferred embodiments are, however, not intended to be limiting, but, on the contrary, are included in a non-limiting sense apt to alterations and modifications, based primarily on dog, leash and leash receptacle sizes, within the scope and spirit of the disclosure and appended claims.

SUMMARY OF THE INVENTION

The bicycle handlebar leash attachment device that is the present invention provides for a precisely positionable and positioned handlebar mounted system representationally comprising a four-part design centered atop the handlebars of a bicycle, straddling and above the bicycle's handlebar clamp. The system itself is secured in place via 2 (two) U-shaped handlebar mount clamps, fastened to the underneath side of the handlebar mount system with 4 (four)-fasteners. Once securedly mounted to the handlebar, the present invention is said to be "clamped" to and around the bicycle's handlebars, ensuring safety and stability during use.

Structurally, the front top-center section of the mount system is a semi-circular U-shaped design with an inter-beveled shape. This design serves as a housing for the leash itself, providing a secure and designated space for its placement. The leash thereby integrates into this section, allowing for placement, removal and replacement (i.e., "sliding in and out"), facilitating quick and easy placement, use and replacement for the operator/rider.

As further represented, the portion of the system facing the rider features a pivoting clamp mechanism designed to open and close via a latch system. The rearward-facing latch system mirrors the inter-beveled design existing at the front of the handlebar system to mate the two. Upon closure and securement, the set and designated placement of the dog leash allows the bicycle operator to place and replace, secure and release, the leash quickly and easily as necessity requires or designates.

The present invention is further enhanced by beveled disks located at the bottom of the leash receptacle facilitating ease of placement and removal of said leash receptacle wherein the leash receptacle itself is a retractable leash, typically made of nylon, whereby the retractable device is contemplated to be made of hard plastic, semi-plastic, metal or a strong composite material.

The leash system that is the present system is capable of allowing the operator to release and retract the leash lead attached to a dog via a spring-loaded feed/break and release mechanism within a rigid housing wherein the leash itself is traditionally thin as to allow for "coiling" and acceptance within the leash housing when the leash is released and retracted. Also, a grip (handle) and break or "stop" is commonly incorporated into the leash system wherein the operator may control the length of the lead through release/break/retraction and/or retraction/break/release actions. The release is controlled by the dog by facilitating unspooling and the break and retraction is traditionally largely controlled by the operator.

In addition to the structural components, the present system that is the bicycle handlebar leash attachment's composition is representationally an injection molded plastic, although in other preferred embodiments metals, thermoforming plastics, extrusion blow molding, compression molding, or a combination thereof, may be utilized for one to a plurality of components. Inventor contemplates that plastic portions may be molded, extruded or pressed into various shapes so long as the transitory placidity, strength and durability of the molded, extruded or pressed components are ensured and maintained. Moreover, the plastic components may have integrated additives, forming a polymer blend, including stabilizers, dyes, and plasticizers which may be included to improve the durability, workability, color or appearance of each component.

The present bicycle handlebar leash attachment is unique in that it incorporates a front-facing, releasable and retractable leash system wherein the user can control the forward motion of a dog (and distance from the bicycle itself) through the unencumbered utilization of a leash device and system that is free of encumbrances. Precisely, by assuring that a dog is in front of and away from the leash operator, the user may safely operate a bicycle and allow the dog to enjoy exercise without fear of entanglement or injury.

BRIEF DESCRIPTION OF THE DRAWINGS

Advantages and other aspects of the invention will be readily appreciated by those having skill in the art and may be better understood with further reference to the accompanying drawings in which like reference characters designate like or similar elements throughout the several figures of the drawings and wherein.

It should, however, be understood that the above figures and summary are not intended to limit the invention, system and use to the particular embodiment disclosed, but on the contrary, the invention disclosure is intended to cover all modifications, alternatives and equivalents falling within the spirit and scope of the invention as defined within the claim's broadest reasonable interpretation consistent with the specification.

DETAILED DESCRIPTION OF THE PREFERRED EMBODIMENTS

A detailed description of the preferred embodiments of the invention are disclosed and described below. Yet, each and every possible dimension and arrangement, within the limits of the specification, are not disclosed as various permutations are postulated to be in the purview and contemplation of those having skill in the art. It is therefore possible for those that have skill in the art to practice the disclosed invention while observing that certain features and spatial arrangements are relative and capable of being amended and adapted, arranged and rearranged at various points about the present invention (by manufacturer or by cyclist) that nonetheless accomplishes the remediation of one or more of the infirmities as outlined and discussed above in the field of attachable, detachable with placeable and replaceable attachment quick release and uses thereof. As well, the present invention device and system components (i.e., clamps, releases, springs and the like) leash receptacle, leash length, thickness and composition themselves may be sized (i.e. enlarged or shrunken) so long as the proportions are maintained that allow for maintaining of esthetic appearance and proper functioning of the present invention.

Equally, it should be observed that the present invention can be understood, in terms of both structure and function, from the accompanying disclosure taken in context with the associated drawings. And whereas the present invention and method of use are capable of several different embodiments and iterations, which can be modified into several different configurations, each exhibiting accompanying interchangeable functionalities, without departing from the scope and spirit of the present application as shown and described.

Figure 1A:
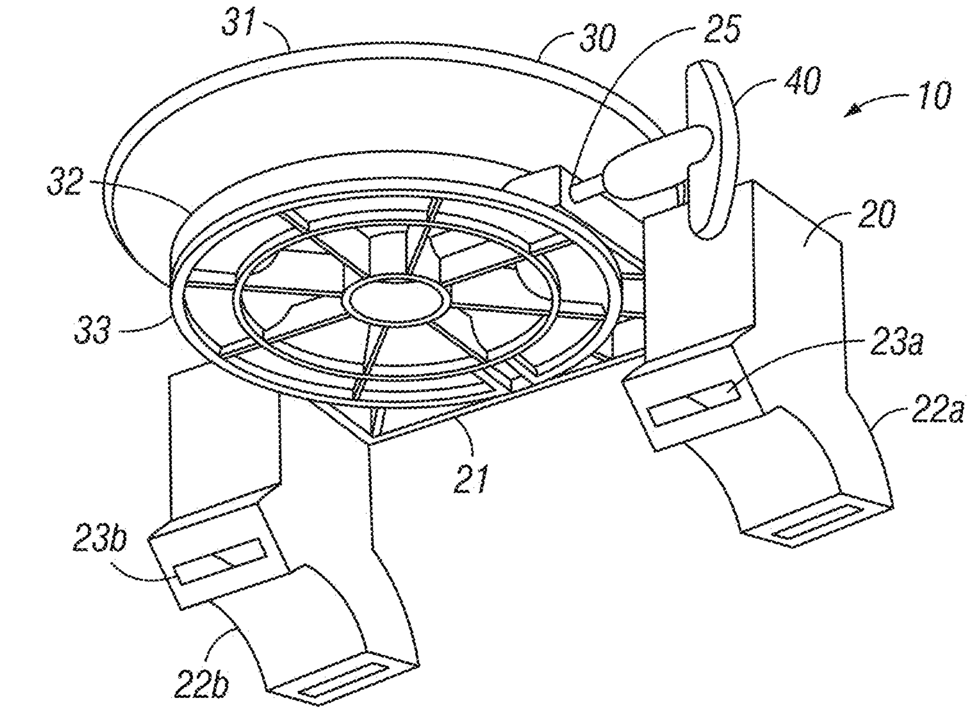
FIG. 1A illustrates a bottom view of the bicycle dog leash attachment system with beveled receiving disk and a quick release latch pin.
Figure 1B:
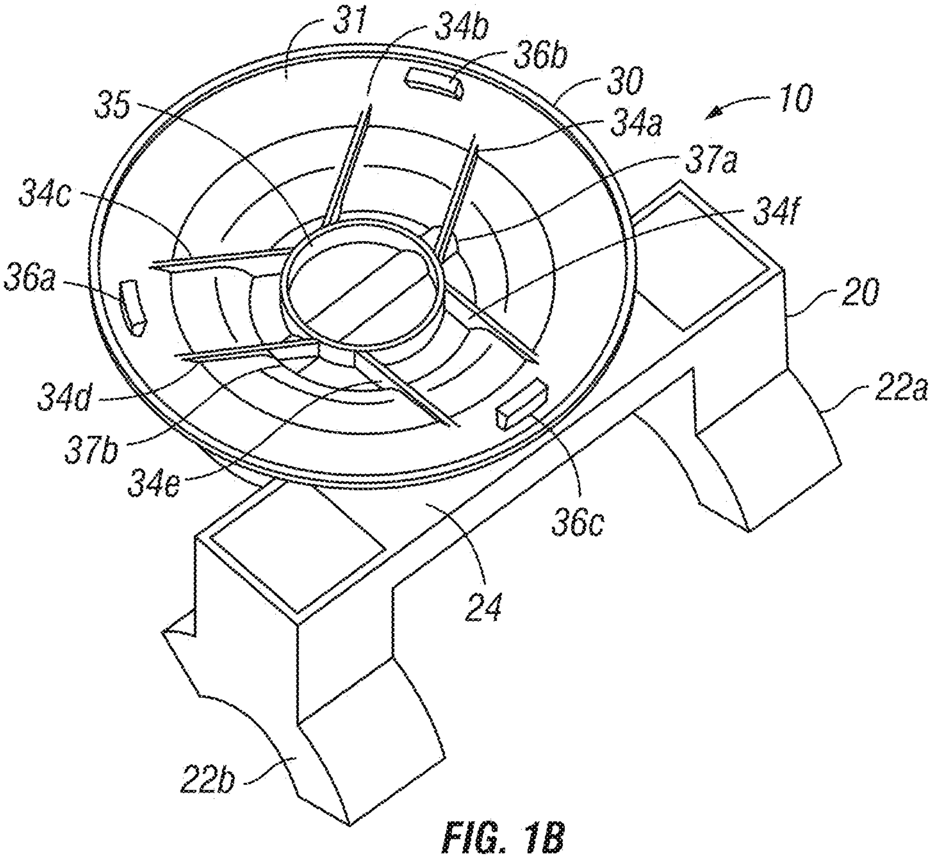
FIG. 1B illustrates a top view of the bicycle dog leash attachment system with beveled receiving disk placed in the receiving area or housing for a leash receptacle in the mount of the system.
Figure 4A:
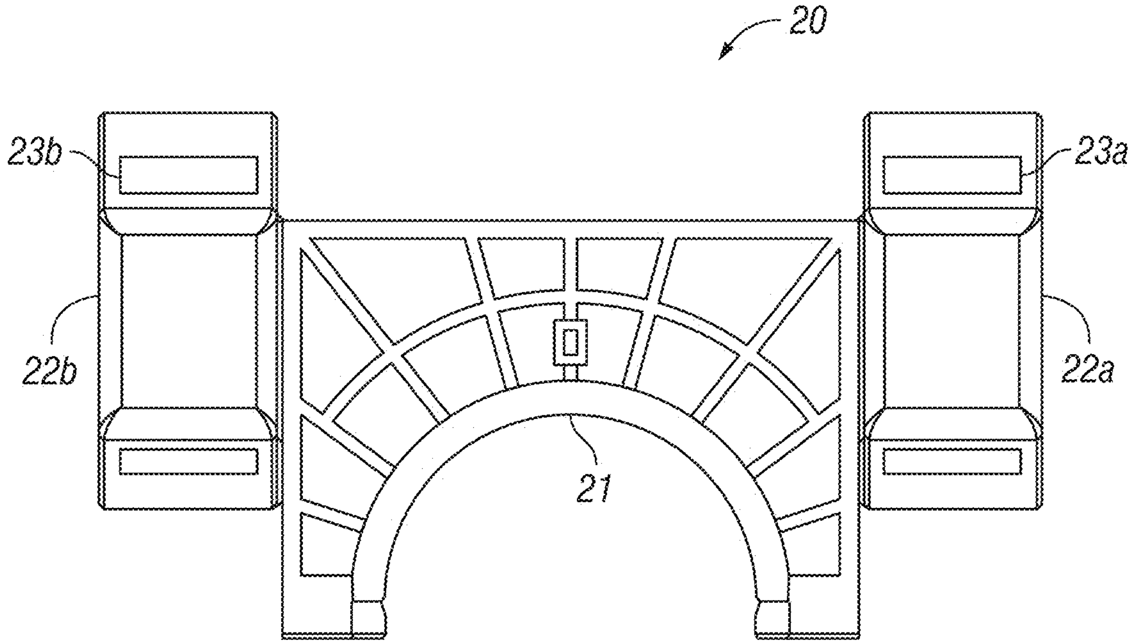
FIG. 4A illustrates the view of the bicycle handlebar mount from the bottom.
Figure 4B:
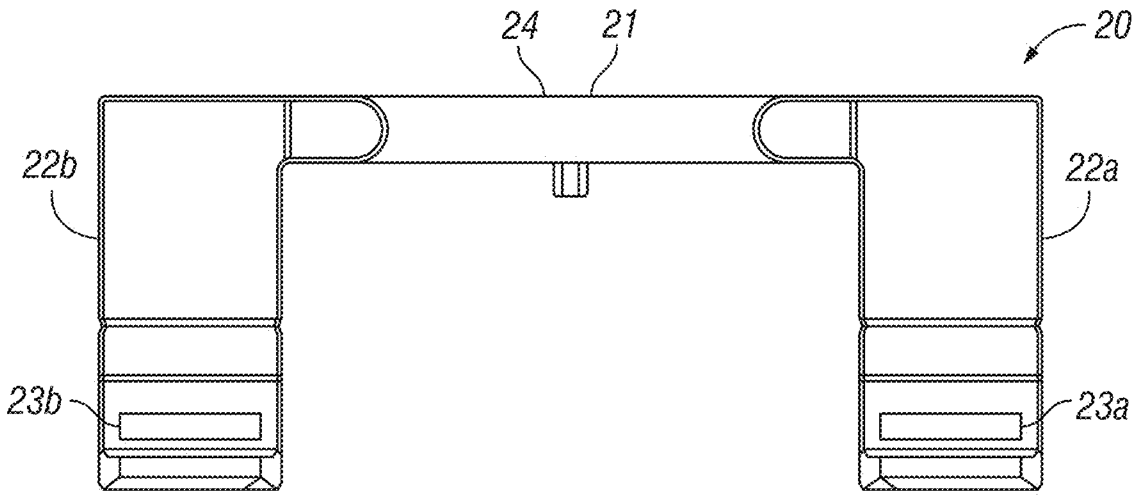
FIG. 4B illustrates the lateral view of the bicycle handlebar mount.

As shown in FIG. 1A and FIG. 1B, the bicycle handlebar leash attachment system 10, which is the present invention, comprises a bicycle handlebar mount 20, a beveled receiving disk 30, and a quick release latch pin 40. FIG. 4A and FIG. 4B illustrate the bottom view and lateral view of mount 20, respectively. As shown in these figures, the bicycle handlebar mount 20 comprises a top surface 24 which extends downwards at two ends to form at least two U-shaped mount clamps 22*a* and 22*b* (collectively referred to as "mount clamp 22"). In the center and along one side of the top surface 24, there is a semi-circular U-shaped flange with inter-beveled shape receiving area or housing 21 for a leash receptacle 50. Mount 20 can be of different shapes and sizes and made of different materials, including but not limited to nylon with super fibers. Mount clamp 22 further comprises clamp receivers 23*a* and 23*b* (collectively referred to as "clamp receiver 23").

Figure 2A:
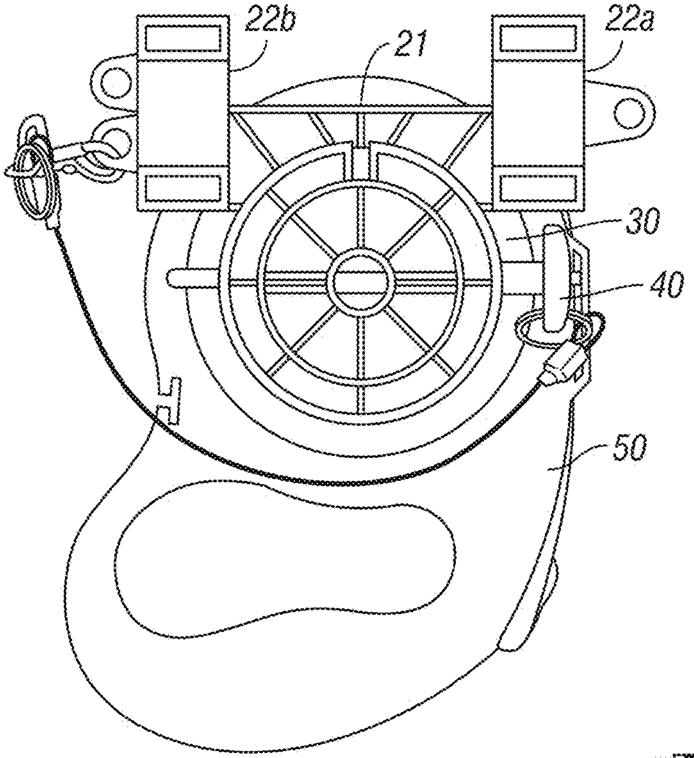
FIG. 2A illustrates a bottom view of the bicycle handlebar leash attachment system with a quick release latch pin and a beveled receiving disk attached to a retractable dog leash.
Figure 2B:
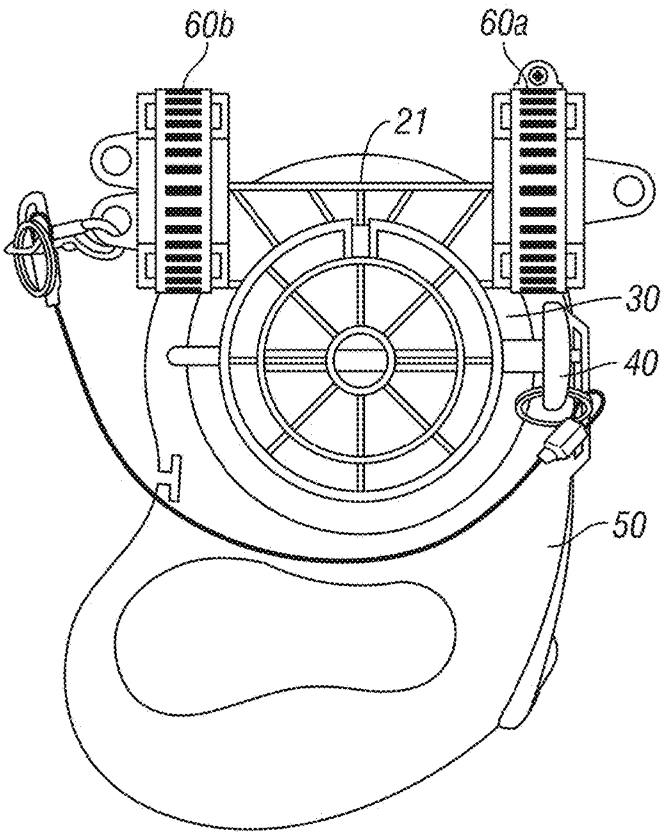
FIG. 2B illustrates a bottom view of the bicycle handlebar leash attachment system with adjustable clamps, a quick release latch pin, and a beveled receiving disk attached to a retractable dog leash.
Figure 3A:
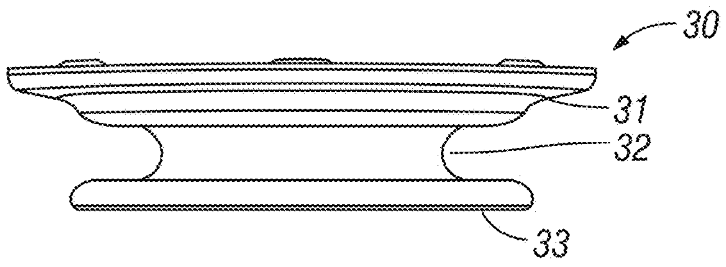
FIG. 3A illustrates the lateral view of the beveled receiving disk.
Figure 3B:
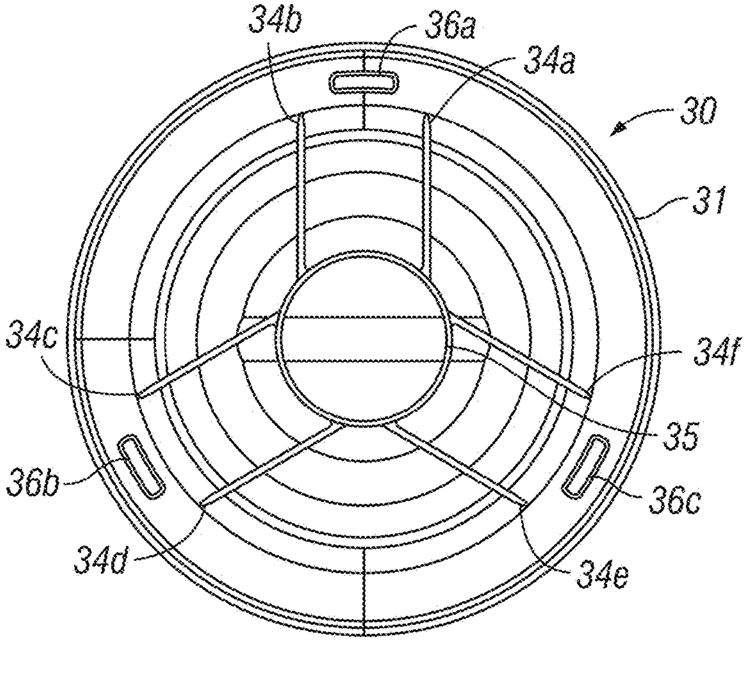
FIG. 3B illustrates the view of the beveled receiving disk from a top view.
Figure 3C:
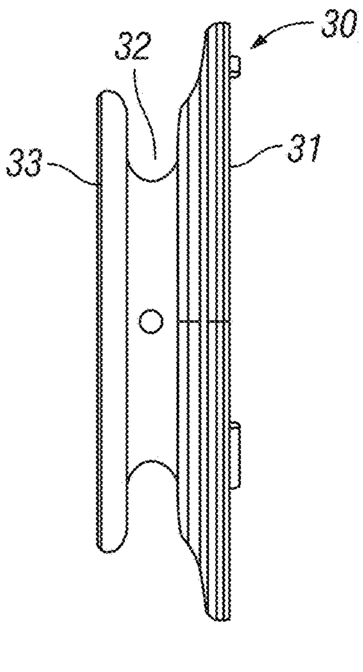
FIG. 3C illustrates the view of the beveled receiving disk when placed on its side.

Inserted in the receiving area or housing 21 is the beveled receiving disk 30. FIGS. 3A, 3B, and 3C illustrate different views of receiving disk 30. Receiving disk 30 comprises a broad top section 31 which is designed and shaped to accommodate the shape and size of a leash receptacle. The receiving disk 30 also comprises a narrower (than the top section 31) neck 32 and a base 33 (also shown in FIGS. 3A and 3C) The neck 32 and base 33 of the receiving disk 30 are sized so that receiving disk 30 is inserted in the receiving area or housing 21 while the small section of outer rim of the top section 31 rests on surface 24 (FIG. 4B) of the mount 20. Additionally, mount 20 comprises two orifices 25*a* and 25*b* (collectively, referred to as "orifice 25") across from each other or on the opposite side of each other in receiving area or housing 21 to insert quick release latch pin 40. The quick release latch pin is inserted through orifice 25 and passes through orifices 37*a* and 37*b* (collectively referred to as "orifice 37") in the receiving disk 30. In other words, the latch pin 40 goes from one end of mount 20 to the other end of mount 20 while passing through receiving disk 30. The latch pin 40 has a little ball bearing at the end with a push button that releases latch pin 40. Mount 20 also has a supporting or attachment means for latch pin 40 as shown in FIG. 2A and FIG. 2B. The quick release latch pin 40 holds the receiving disk 30 attached to leash receptacle 50 securely in the receiving area or housing 21 and also allows quick release of the same. The receiving disk 30 can be of different shapes and sizes designed to accommodate a leash receptacle and can be made of different materials including but not limited to nylon with superfibers. The quick release latch pin 40 is made of different materials including but not limited to a metal with a plastic front that attaches to the metal latch pin 40 and has a small ball bearing at the end that releases the latch pin 40 when the button is pushed.

FIG. 1B illustrates the view of the receiving disk 30 when inserted or placed in mount 20 from the top. FIG. 3B illustrates the view of the receiving disk 30 alone from the top. As shown in both these figures, located inside and in the center of receiving disk 30 is ring 35. Extending from ring 35 and touching the inner surface of receiving disk 30 are lattices or bracing supports 34*a*, 34*b*, 34*c*, 34*d*, 34*e*, 34*f* (collectively referred to as "support 34"). Ring 35 and support 34 surface area for the leash receptacle to rest on. Additionally, located inside receiving disk 30 are points of attachment 36*a*, 36*b*, 36*c* (collectively referred to as "point of attachment 36"). Point of attachment 36 holds the leash receptacle firmly in receiving disk 30. The number of supports and points of attachment may vary depending on the structural need.

FIG. 2A and FIG. 2B illustrate views of the bicycle handlebar leash attachment system 10 with a quick release latch pin 40 and a beveled receiving disk 30 attached to a retractable dog leash 50 from the bottom. FIG. 2B further illustrates bottom view of the bicycle handlebar leash attachment system with adjustable clamps 60*a* and 60*b* (collectively referred to as "clamp 60") inserted in clamp receiver 23.

Figure 5:
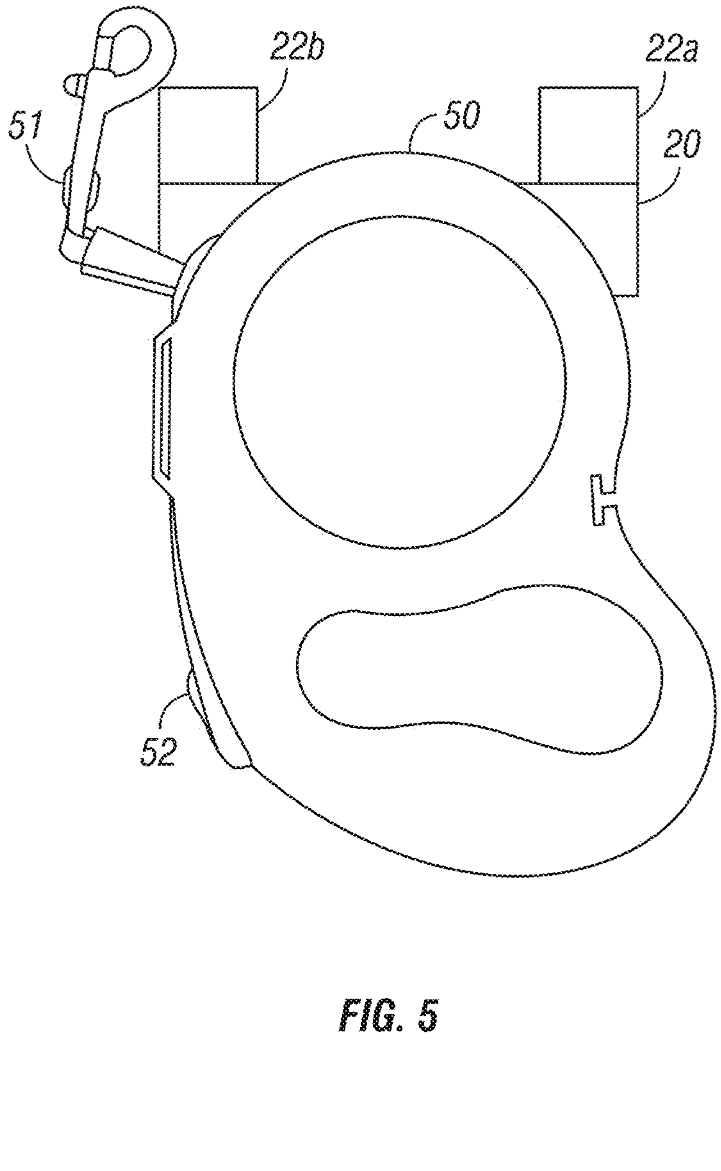
FIG. 5 illustrates top view of the bicycle handlebar leash attachment system, and a retractable dog leash placed in the receiving area or housing for the leash receptacle in the mount of the system.

When viewed from top as shown in FIG. 5, leash receptacle 50 attached to receiving disk 30 is placed in receiving area or housing 21 of mount 20 in such a way that hook 51 of leash receptacle is facing forward and away from bicycle rider and control 52 is proximate to the rider (not shown). This placement of hook 51 allows the dog to move ahead or in front of the bicycle and avoid collision between the bicycle, bicycle rider, and the dog. Further, by placing control 52 proximate (closer) to the rider, the bicycle rider can release the leash, alter the length of the leash easily and control the leashes breaking function. Furthermore, a small section of the outer rim of leash receptacle 50 close to hook 51 rests on top of receiving area or housing 21 of mount 20.

Figure 6:
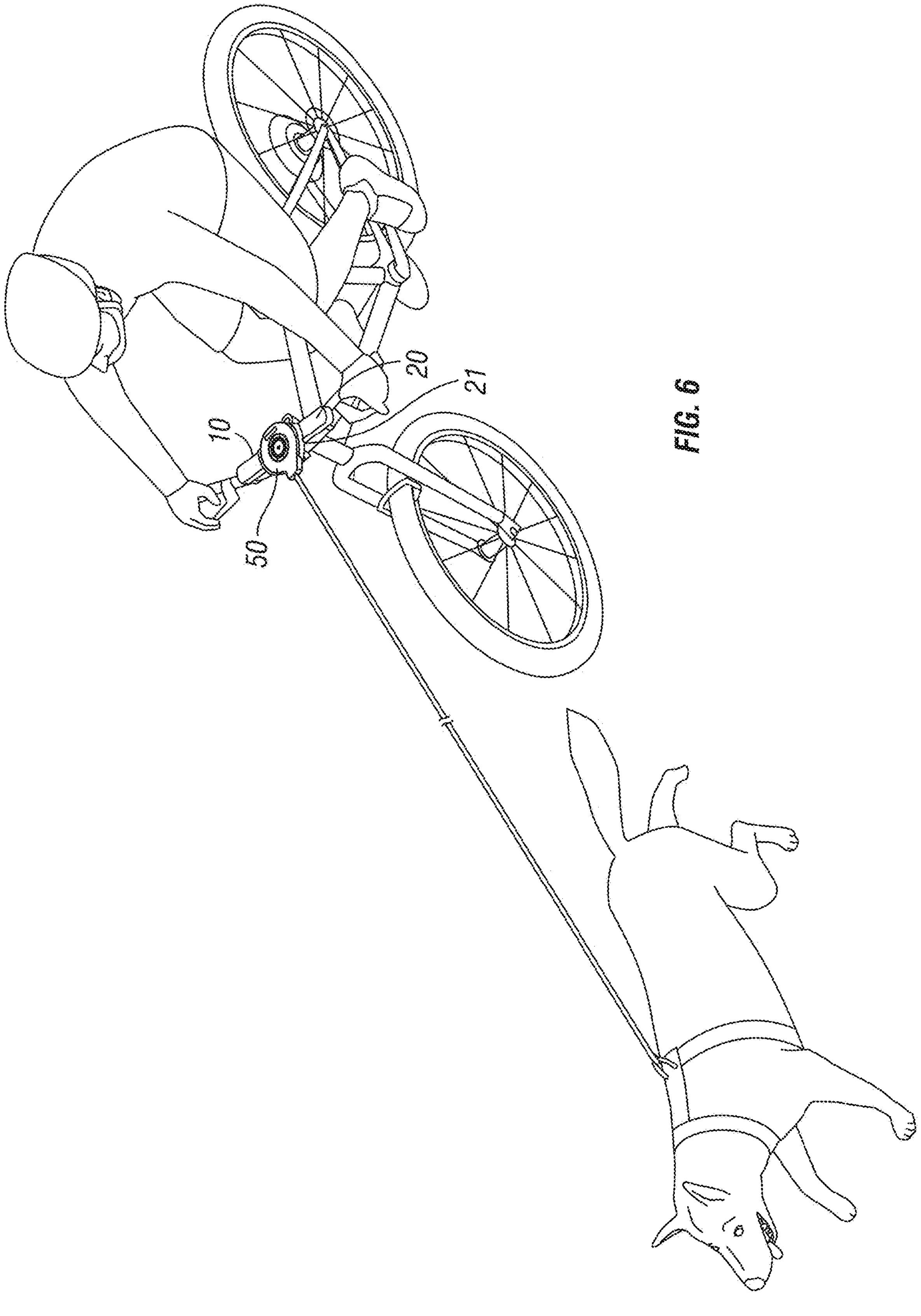
FIG. 6 is an illustration of the bicycle handlebar leash attachment system attached to the bicycle and a retractable leash attached to the beveled receiving disk and placed or inserted into the receiving area or housing for the leash receptacle in the mount of the system with a dog walking in front of the bicycle rider; This is a full illustration of invention in use.
Figure 7:
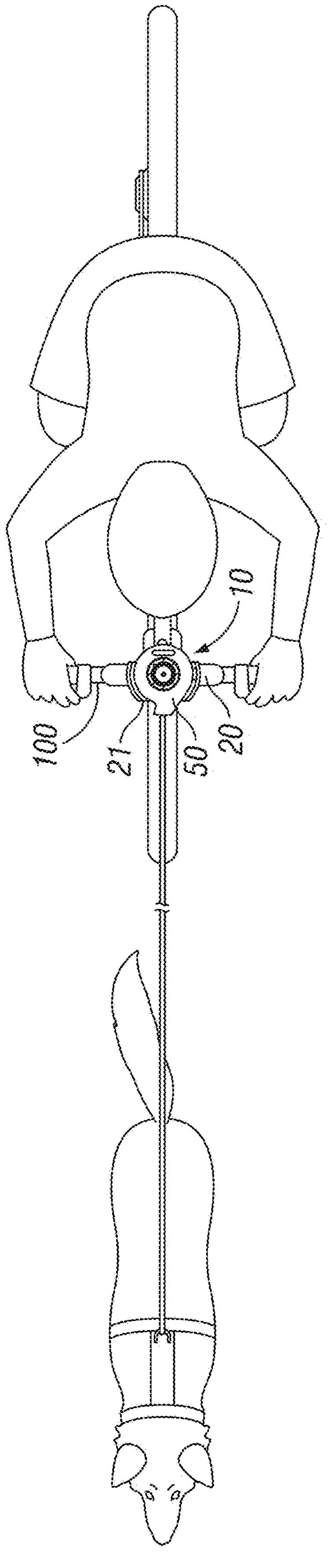
FIG. 7 illustrates a top view of the present invention in use showing a bicycle rider and a dog on a leash, the receptacle of the leash is placed in the receiving area or housing in the mount which is attached to the front handlebar of the bicycle.

FIG. 6 and FIG. 7 illustrate present invention in use. FIG. 6 illustrates side and top view of bicycle handlebar leash attachment system 10 while FIG. 7 illustrates top view of the same. The bicycle handlebar leash attachment system 10 is placed on top of handlebar 100 of the bicycle and secured to handlebar 100 by means of plurality of adjustable metal hose clamps 60 that pass through clamp receiver 23 in the mount clamp 22. Leash receptacle 50 is attached to beveled receiving disk 30 and placed in receiving area or housing 21 of mount 20 in front and on top of bicycle handlebar 100. Alternatively, beveled disk 30 is placed first in receiving area 21 and leash receptacle 50 is then placed in receiving disk 30. In both cases, leash receptacle 50 is placed in such a way that hook 51 that attaches to dog's collar in front of a bicycle and control 52 is proximate to and advantageously closer to the bicycle rider to provide for ergonomic control and increased manageable safety of rider and animal. Hook 51 is then attached to dog's collar giving the present invention the crucial attachment function required for proper operation of the present invention. Thereby, attachment and securement is ensured for both leash system to bicycle as equally as leash system leash to canine wherein all three components (i.e., bicycle, leash attachment system and canine) are reversibly connected and connectable.

Figure 8:
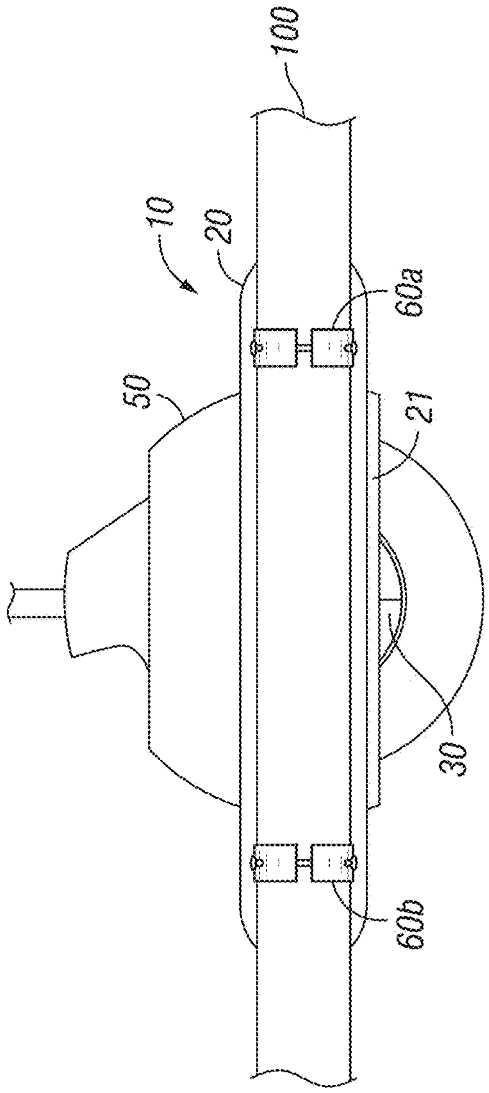
FIG. 8 illustrates an inferior view from the bottom of the bicycle handlebar leash attachment system attached to the bicycle handlebar via clamps with the retractable leash receptacle attached to the beveled receiving disk and placed in the receiving area or housing in the mount of the system.

FIG. 8 illustrates an inferior view of present invention wherein Mount 20 is attached to handlebar 100 via clamp 60 and leash receptacle 50 is attached to receiving disk 30 which is placed in receiving area 21 of mount 20 evidencing secure attachment of the present leash attachment system.

PREFERRED EMBODIMENTS

A detailed description of the preferred embodiments of the invention is disclosed and described below. Yet, each and every possible feature, within the limits of the specification, are not disclosed as various permutations are postulated to be in the purview and contemplation of those having skill in the art.

In a preferred embodiment of the present invention is a bicycle handlebar leash attachment system, comprising: a bicycle handle bar; a retractable leash; a bicycle handlebar mount; said bicycle handlebar mount being centrally located between bicycle handlebar handles, said handlebar mount exhibiting a receiving area or housing for a leash receptacle, wherein the receiving area or housing comprises a semi-circular U-shaped flange with an inter-beveled shape and is located in the center of the mount; a beveled receiving disk that attaches to the bottom surface of the leash receptacle, wherein said beveled disk is placed in the receiving area or housing for the leash receptacle; said leash receptacle holding the retractable leash in the mount; and a quick release latch pin.

In one embodiment of the preferred bicycle handlebar leash attachment system, centrally and roughly equidistant from each handlebar grip, where the mount straddles a bicycle handlebar and is placed on top of the handlebar.

In another embodiment of the preferred bicycle handlebar leash attachment system, the mount comprises a top surface that extends downwards at its two ends to form 2 (two) U-shaped mount clamps to securely fasten the system to the underneath of the handlebar with fasteners, centrally, wherein said fasteners comprise adjustable metal clamps.

In yet another embodiment of the preferred bicycle handlebar leash attachment system, the quick release latch pin is inserted through at least one orifice in the receiving area or housing in the mount and passes through the receiving disk allowing for rapid disengagement of said leash system from a bicycle's handlebar's central mount.

In still yet another embodiment of the preferred bicycle handlebar leash attachment system, the quick release latch system holds the receiving disk attached to the leash receptacle securely and also allows for quick release of the receiving disk when required.

In another embodiment of the preferred bicycle handlebar leash attachment system, the receiving disk comprises a broad top section, narrower neck and a base, wherein small section of outer rim of top section rests on the surface of the mount, while the neck and base are inserted in the receiving area of the mount.

In yet another embodiment of the preferred bicycle handlebar leash attachment system, the receiving disk further comprises a centralized ring (i.e., a ring exhibited in the center of a receiving disk), evidencing a plurality of lattices, supports and/or support structures that extend from the ring and abut the inner surface of the receiving disk, plurality of points of attachments, or a combination thereof.

In another embodiment of the preferred bicycle handlebar leash attachment system, the leash receptacle comprises a retractable device or system and an internalized leash, said retractable device or system being a spring-loaded feed/break and leash release mechanism for attachment to a canine.

In yet another embodiment of the preferred bicycle handlebar leash attachment system, the leash receptacle further comprises a control that can grip, release and "break" adjusting the length of the leash, a hook to connect to collar of the canine or both.

In still yet another embodiment of the preferred bicycle handlebar leash attachment system, the leash receptacle is made of hard plastic, semi-plastic, metal, a composite material, or a combination thereof.

In another embodiment of the preferred bicycle handlebar leash attachment system, the mount is made of injection molded plastic, thermoforming plastics, extrusion blow molding, compression molding, or a combination thereof, said plastic further comprising additives to improve durability, workability, color or appearance of the system.

In yet another embodiment of the preferred bicycle handlebar leash attachment system, the leash receptacle is placed with the hook for the collar facing in front of the handlebar mount to enable forward motion of the dog so that the dog precedes the bicycle and the control for the leash and a control mechanism proximate to the bicycle rider to enable ergonomic and safe operation of the system.

In another preferred embodiment of the present invention is a method of securing a canine to a bicycle via a bicycle handlebar retractable leash attachment system, comprising: attaching the bicycle handlebar leash attachment system superiorly atop the handlebars of the bicycle, wherein said system comprises: a bicycle handlebar; a bicycle handlebar mount, said bicycle handlebar mount being centrally located between bicycle handlebar handles; said handlebar mount exhibiting a receiving area or housing for a leash receptacle, wherein the receiving area or housing comprises a semi-circular U-shaped flange with an inter-beveled shape located in the center of the mount; the U-shaped flange operable for attachment to the handlebars; a beveled receiving disk for a leash receptacle; a leash receptacle; a retractable leash; and a quick release latch pin; comprising the steps of: attaching the beveled disk to the bottom surface of the leash receptacle; placing the beveled disk attached to the leash receptacle in the receiving area or housing in the mount such that hook for a canine collar is front-facing and a control for the retractable leash is proximate to the bicycle rider; fastening the leash receptacle by inserting the quick release latch pin through at least one orifice in the receiving area or housing in the mount and the receiving disk; fastening the retractable leash to the leash receptacle; and attaching the hook to the collar of the canine. Moreover, a latch and detent pin mechanism is integrated into the leash attachment mechanism wherein, where the leash is required to be unattached from the handlebars, a "quick release" mechanism is actuatable to facilitate immediate release of said leash system from said handlebars.

In one embodiment of the preferred method, wherein attaching the mount is achieved via a top surface that extends downwards at its two ends to form 2 (two) U-shaped mount clamps and securely fastening the system to the underneath of the handlebar with fasteners, wherein said fasteners comprises adjustable metal clamps.

In another embodiment of the preferred method, wherein accepting the receiving disk cis facilitated via a broad top section, narrower neck and a base, wherein a small section of outer rim of top section rests on the surface of the mount, while the neck and base are inserted in the receiving area of the mount.

In yet another embodiment of the preferred method, wherein supporting retractable leash into the receiving disk is facilitated by a centrally disposed ring, plurality of abutting lattices, or supports and/or support mechanisms extending from the ring and touch (abut) or made to communicate with the inner surface of the receiving disk, plurality of points of attachments, or a combination thereof.

In another embodiment of the preferred method, wherein inserting the retractable leash into the leash receptacle is achieved wherein said retractable leash device or leash system, comprised of a retractable leash, consists of inserting a spring-loaded feed/break, retraction and release mechanism into the leash receptacle, attaching the hook to the canine and actuating the spring-loaded feed/break, retraction and release mechanism after attachment to the canine.

In yet another embodiment of the preferred method, the leash receptacle is made of hard plastic, semi-plastic, metal, a composite material, or a combination thereof.

In still yet another embodiment of the preferred method, the mount is made of injection molded plastic, thermoforming plastics, extrusion blow molding, compression molding, or a combination thereof, said plastic further comprising additives to improve durability, workability, color or appearance of the system

I claim:

1. A bicycle handlebar retractable leash attachment system, comprising:
- a bicycle handle bar;
- a retractable leash;
- a bicycle handlebar mount;
  - said bicycle handlebar mount being centrally located between bicycle handlebar handles;
  - said handlebar mount exhibiting a receiving area or housing for a leash receptacle wherein the receiving area or housing comprises a semi-circular U-shaped flange with an inter-beveled shape located in the center of the mount;
- a beveled receiving disk that attaches to the bottom surface of the leash receptacle, wherein said beveled disk is placed in the receiving area or housing for the leash receptacle;
- said leash receptacle holding the retractable leash in the mount; and
- a quick release latch pin.

2. The system of claim 1, wherein the mount is made of injection molded plastic, thermoforming plastics, extrusion blow molding, compression molding, or a combination thereof, said plastic further comprising additives to improve durability, workability, color or appearance of the system.

3. The system of claim 1, wherein the mount straddles the bicycle handlebar and is placed on top of the handlebar.

4. The system of claim 3, wherein the mount comprises a top surface that extends downwards from each of two ends to form 2 (two) U-shaped mount clamps to securely fasten the system to the underneath of the handlebar with fasteners, wherein said fasteners comprises adjustable metal clamps.

5. The system of claim 1, wherein the quick release latch pin is inserted through at least one orifice in the receiving area or housing in the mount and passes through the receiving disk.

6. The system of claim 5, wherein the quick release latch system holds the receiving disk attached to the leash receptacle securely and also allows for quick release of the receiving disk.

7. The system of claim 1, wherein the receiving disk comprises a broad top section, narrower neck and a base, wherein small section of outer rim of top section rests on the surface of the mount, while the neck and base are inserted in the receiving area of the mount.

8. The system of claim 7, wherein the receiving disk further comprises a centralized ring disposed in in the center of the receiving area abutted by a plurality of lattices or supports extending outward from the ring and touching the inner surface of the receiving disk, plurality of points of attachments, or a combination thereof.

9. The system of claim 1, wherein the leash receptacle comprises a retractable leash device or system, said retractable device or system being a spring-loaded feed/break and release mechanism for attachment to a canine.

10. The system of claim 9, wherein the leash receptacle further comprises a control that can grip, release and break the length of the leash, a hook to connect to collar of the canine or both.

11. The system of claim 10, wherein the leash receptacle is placed with the hook for the collar facing in front of the handlebar mount to enable forward motion of the canine so that the canine precedes the bicycle and the control for the leash proximate to the bicycle rider to enable ergonomic and safe operation of said system.

12. The system of claim 9, wherein the leash receptacle is made of hard plastic, semi-plastic, metal, a composite material, or a combination thereof.

13. A method of securing a canine to a bicycle via a bicycle handlebar retractable leash attachment system, comprising:

attaching the bicycle handlebar leash attachment system superiorly atop the handlebars of a bicycle, wherein said system comprises:

a bicycle handlebar;

a bicycle handlebar mount;

said bicycle handlebar mount being centrally located between bicycle handlebar handles;

said handlebar mount exhibiting a receiving area or housing for a leash receptacle, wherein the receiving area or housing comprises a semi-circular U-shaped flange with an inter-beveled shape located in the center of the mount;

said U-shaped flange operable for attachment to said handlebars;

a beveled receiving disk for a leash receptacle;

a leash receptacle;

a retractable leash; and a quick release latch pin;

comprising the steps of:

attaching the beveled disk to the bottom surface of the leash receptacle;

placing the beveled disk attached to the leash receptacle in the receiving area or housing in the mount such that a hook for a canine collar is front-facing and a control for the retractable leash is proximate to the bicycle rider;

fastening the leash receptacle to the handlebars by inserting the quick release latch pin through at least one orifice in the receiving area or housing in the mount and the receiving disk;

fastening the retractable leash to said leash receptacle; and attaching the hook to the collar of the canine.

14. The method of claim 13, wherein attaching the mount is achieved via a top surface that extends downwards at each of two ends to form 2 (two) U-shaped mount clamps and securely fastening the system to the underneath of the handlebar with fasteners, wherein said fasteners comprises adjustable metal clamps.

15. The method of claim 13, wherein inserting said retractable leash into the leash receptacle is achieved wherein said retractable leash device or leash system, comprised of a retractable leash, consists of inserting a spring-loaded feed/break, retraction and release mechanism into said leash receptacle, attaching said hook to a canine and actuating said spring-loaded feed/break, retraction and release mechanism after attachment to a canine.

16. The method of claim 13, wherein the leash receptacle is made of hard plastic, semi-plastic, metal, a composite material, or a combination thereof.

17. The method of claim 13, wherein the mount is made of injection molded plastic, thermoforming plastics, extrusion blow molding, compression molding, or a combination thereof, said plastic further comprising additives to improve durability, workability, color or appearance of the system.

18. The method of claim 13, wherein accepting the receiving disk is facilitated via a broad top section, narrower neck and a base, wherein a small section of outer rim of top section rests on the surface of the mount, while the neck and base are inserted in the receiving area of the mount.

19. The method of claim 18, wherein supporting said retractable leash into the receiving disk is facilitated by a centrally disposed ring, a plurality of abutting lattices or supports extending from said ring and made to communicate with the inner surface of the receiving disk, a plurality of points of attachments, or a combination thereof.

* * * * *